Dec. 5, 1967 G. WICHMANN 3,357,015
METHOD AND DEVICE FOR THE LOCATION OF OBJECTS
Filed July 29, 1965 2 Sheets-Sheet 1

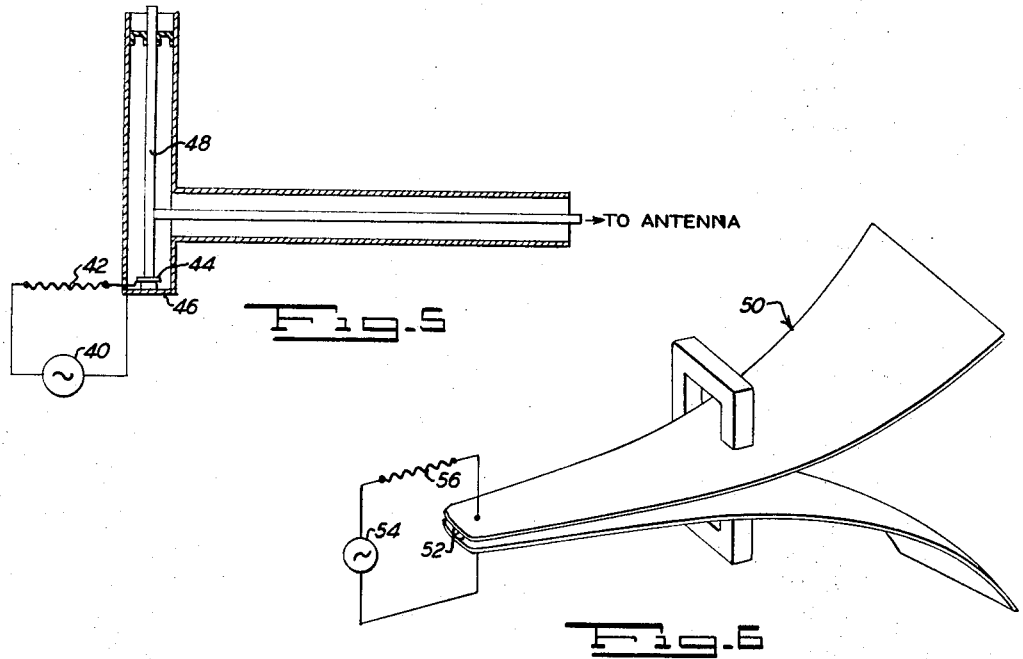
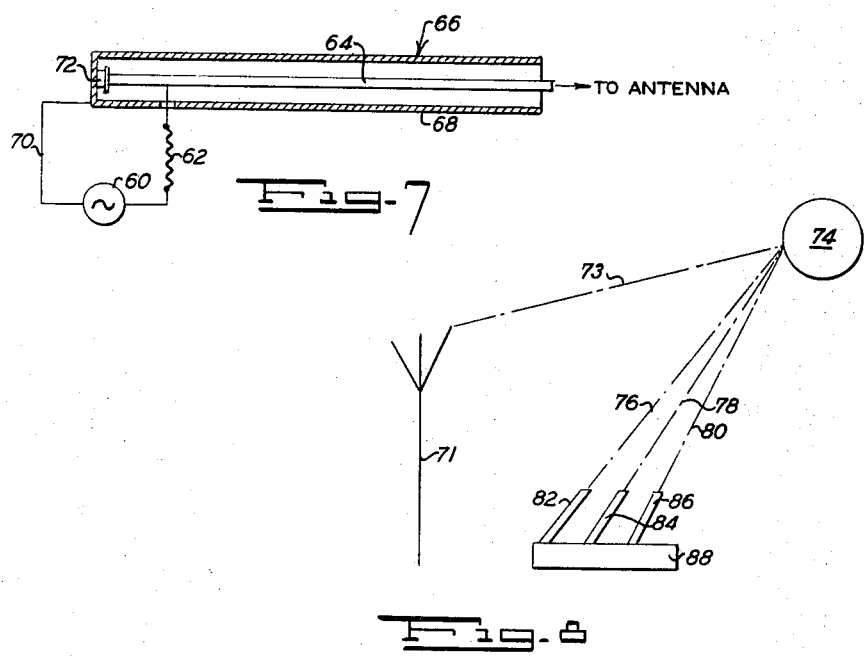

United States Patent Office 3,357,015
Patented Dec. 5, 1967

3,357,015
METHOD AND DEVICE FOR THE LOCATION OF OBJECTS
Gunter Wichmann, Heidelberg, Pfaffengrund, Germany, assignor to Eltro G.m.b.H. & Co., Heidelberg, Germany
Filed July 29, 1965, Ser. No. 475,826
Claims priority, application Germany, Aug. 12, 1964, E 27,593
1 Claim. (Cl. 343—16)

This invention relates to methods and devices for the location, and especially for the determination of distance, of objects by emitting and receiving temporally short sequencies of oscillations in the electromagnetic spectrum in accordance with radar techniques.

Such techniques and their mode of operation have been known for years. There is, for example, a device for carrying out such a method comprising a magnetron which is excited by brief pulsing of the anode voltage for producing high-frequency electromagnetic oscillations which last during the pulsing time and are emitted toward the object by way of a transmitting antenna. The high-frequency pulses reflected by the object are received by way of a receiving antenna, are converted into an intermediate-frequency pulse by way of an appropriate mixing circuit, and are finally converted into a D.C. pulse by rectification. A comparison of the time between the emitted pulse and the received pulse determines the traveling time of the electromagnetic waves from the device to the object and back and this permits determining the distance of the object.

A defect of previously known methods, which may be quite serious in some cases in which these methods are used, resides in the fact that it is impossible to keep the keying or pulsing times sufficiently short, thus producing a lack of accuracy in measuring the distance involved. One of the reasons is the capacity load of the keying circuits. In addition, an adverse effect is produced by the need to connect or disconnect a special oscillator tube, which serves to produce the high-frequency, or to arrange the key modulator circuit in the connecting line between the oscillator tube and the antenna.

In contrast thereto, the method according to the invention is characterized in that the carrier-frequency transmitting pulses are produced by the shock or impulse of a member, capable of natural oscillation, of the transmitting antenna and of its lead wires by means of high-power D.C. pulses or jumps.

The omission of the oscillator tube itself, made possible by this method, and the resulting elimination of the keying of said tube, permit obtaining substantially shorter keying times than in the past, for example, a few nano-seconds. The utilization of transmitting antenna which is required anyway, and its lead line for the production of high-frequency oscillations means in many fields a substantial reduction of expenditure of space, weight, costs and so forth.

The method according to the invention is advantageously characterized in that the receipt of the transmitting pulses reflected by the object is effected according to so-called "sampling method."

This method is very well known from the oscillograph technique for representing extremely short temporal processes, and a discussion thereof is therefore unnecessary. Its comparatively small cost is fully compatible with that of the emitting side.

It is of special advantage to use the method if it is intended to determine not only the distance, but also the direction of the object to be located. The possibility, offered by the method according to the invention, to emit and receive extremely short pulses which, upon propagation in free space, are only some ten centimeters long, permits obtaining, by multiple arrangement of fixed antennae on a short base, at least a rough determination of the direction of the object. In this case the method is preferably characterized in that, by using either three transmitting antennae or three receiving antennae, which are arranged on a short base stationarily and without mechanical pivoting possibility, the directional position of the object in relation to the normal direction given by the arrangement of the antennae is determined by measuring the differences in travel time between the three resulting receiving pulses.

A device for carrying out the method according to the invention is characterized, particularly advantageously, in that there is used, as a member of the transmitting antenna, capable of natural oscillation, and its lead wire either:

(1) an oscillatory circuit which consists of concentrated or compact structural elements and which is coupled to the lead wire of the antenna, or
(2) a line element of the lead wire of the antenna, or
(3) the antenna itself or one of its members.

The use of the members mentioned above has the inherent advantage that the frequency-determining elements are easily comprehended and can be calculated according to simple and known methods.

As a further development of the invention, a device for carrying out the method is preferably characterized in that the coupling of the high-power D.C. pulses or jumps into the member of the transmitting antenna, capable of natural oscillation, and its lead wire is effected by way of an operating or switching diode arranged therein, specifically a tunnel diode. It has been found that operating diodes, specifically tunnel diodes, permit to obtain extremely short keying times with sufficient power for many purposes.

A constructionally particularly favorable solution for a device for carrying out the method according to the invention is obtained in that the operating diode is arranged as coaxial series resistor in the inner conductor of the lead wire (of the antenna) developed at least partially as coaxial conductor. In this case, the lead wire of the antenna developed in many cases as coaxial cable is practically closed with the operating diode, specifically the tunnel diode, at its inner conductor on the side opposite the antenna.

The first practical experiments carried out according to the method of the invention concerning the special case that extremely short pulses are required, have shown that it is even possible to obtain pulses of about one nano-second with transmitting powers of several 100 mw.

Some embodiments of the invention will next be described with reference to the accompanying drawing, in which:

FIGURE 1 diagrammatically illustrates one embodiment of the invention for producing and transmitting periodically short pulses;

FIGURE 5 illustrates in partially sectional and partially diagrammatic view a further embodiment of the invention;

FIGURE 6 illustrates partially diagrammatically and partially in perspective a further embodiment of the invention;

FIGURE 7 illustrates partially in section and partially diagrammatically a further embodiment of the invention; and FIGURE 8 illustrates diagrammatically a preferred mode of receiving reflected signals in accordance with the invention.

Figure 1:
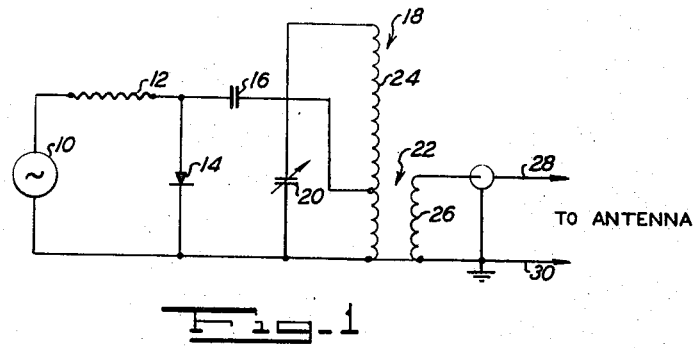

The circuit of FIG. 1 comprises a signal source 10, to which is coupled a resistor 12, there being a tunnel diode 14 coupled between the resistor 12 and one end of the source 10.

A capacitor 16 connects the tunnel diode and resistor to a ringing or resonant circuit 18 comprising a variable condensor 20 and a transformer 22 including windings 24 and 26. Leads 28 and 30 couple the circuit 18 to an antenna (not shown), wherefrom signals are transmitted in accordance with the invention.

Figure 2:
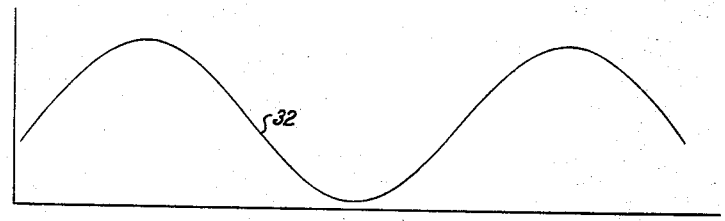
FIGURE 2 illustrates the waveform at one of the elements in the circuit of FIG. 1.
Figure 3:
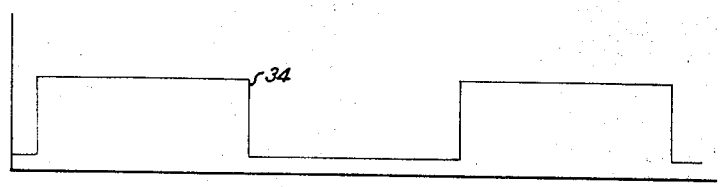
FIGURE 3 illustrates the waveform of another of the elements of the circuit of FIG. 1.
Figure 4:
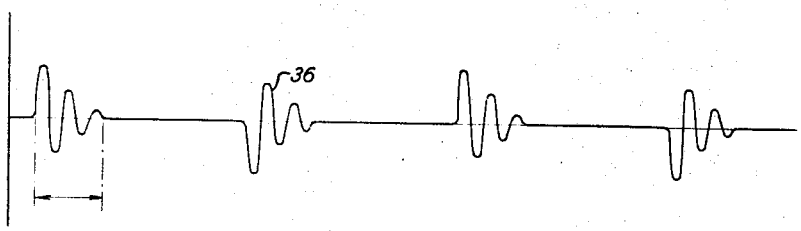
FIGURE 4 illustrates the waveform transmitted to and from the antenna of the circuit of FIG. 1.

The source 10 generates the waveform 32 illustrated in FIG. 2, whereas the tunnel diode 14 provides the waveform 34 illustrated in FIG. 3. Signals of the form indicated in FIG. 4 are transmitted to and from the antenna.

In the embodiment of FIG. 1, the ringing circuit 18 constitutes a part of the transmitting antenna capable of self-oscillation and it will be understood that with the aid of the tunnel diode 14, there are produced high-power direct current pulses which operate to drive the ringing circuit 18.

In the embodiment of the invention illustrated in FIG. 5, there is provided an arrangement of a tunnel diode in connection with a conductor-resonator in the coaxial cable, wherein a conductive portion of the lead line for the antenna serves as a portion of the transmitting antenna capable of self-oscillation.

More particularly, there is illustrated a circuit comprising a source of excitation signals 40 coupled to a resistor 42, the resistor being connected to a tunnel diode 44 and the source being connected to outer conductor 46.

The tunnel diode 44 is connected to the inner conductor 48 and the apparatus is in turn connected to and integrated into an antenna (not shown) which transmits signals such as have been indicated hereinbefore with reference to FIG. 4.

In FIG. 6 is illustrated part of an exponential strip conductor antenna 50 which can be used as the portion capable of self-oscillation and wherein a tunnel diode 52 is employed. Also shown in FIG. 6 are the source 54 of excitation signals and the resistor 56 connected in series between said antenna 50 and the source 54.

FIG. 7 illustrates a further embodiment of the invention in accordance with which a tunnel diode is arranged in the inner conductor of the antenna lead provided in the form of a coaxial cable.

More particularly, there is illustrated a source 60 connected via a resistor 62 to the internal conductor 64 of the coaxial cable 66, whereof the outer conductor 68 is coupled by lead 70 to one end of the source 60.

In FIG. 7 a tunnel diode 72 is provided which is located between one extremity of the inner conductor 64 and the end of the outer conductor 68, the coaxial cable 66 constituting the lead to the antenna (not shown) for purposes of transmitting signals such as have been discussed hereinabove with respect to FIG. 4.

FIG. 8 illustrates that an antenna 70 of the invention may transmit a radar signal such as indicated at 72 to an object 74 which will reflect the signals via a multitude of paths 76, 78 and 80.

These reflected signals may be received by an arrangement of three antennae 82, 84 and 86 mounted in stationary position without possibility of pivotal movement on a base 88.

The directional position of the object 74 in relation to the transmitter can then be determined by measuring the differences in travel time between the three signals resulting in the antennae 82, 84 and 86 according to the "sampling method."

There will now be obvious to those skilled in the art many modifications and variations of the method and structure set forth hereinabove. These modifications and variations will not depart from the scope of the invention if defined by the following claim.

What is claimed is:

Apparatus comprising transmission antenna means including ringing means adapted to generate a resonant signal, control means to shock said ringing means to cause said antenna means to transmit a signal of relatively short duration for reflection by an object which is to be detected, a plurality of fixed receiving antennae to receive the reflected signal whereby the relative position of said object can be determined by the difference in time of reception at the respective receiving antenna, said control including a tunnel diode circuit adapted for transmitting square wave pulses of relatively short duration to said ringing means, said antenna means including an exponential strip conductor antenna with two sections, said tunnel diode being coupled between said sections, and a source of power coupled to and switched by said diode.

References Cited
UNITED STATES PATENTS

| | | | |
|---|---|---|---|
| 2,539,594 | 1/1951 | Rines et al. | 343—18 |
| 3,155,971 | 11/1964 | Hansel | 343—12 |
| 3,172,106 | 3/1965 | Zaleski | 343—101 |
| 3,268,895 | 8/1966 | Colchester | 343—112 |
| 2,422,334 | 6/1947 | Bedford | 343—16 |
| 3,098,973 | 7/1963 | Wickersham et al. | 325—8 X |

RODNEY D. BENNETT, *Primary Examiner.*

J. P. MORRIS, *Assistant Examiner.*